Sept. 16, 1958     J. MEENTS ET AL     2,851,799
GAUGE FOR DETERMINING VERTICAL HEIGHTS AND DEPTHS
Filed April 13, 1956     3 Sheets-Sheet 1
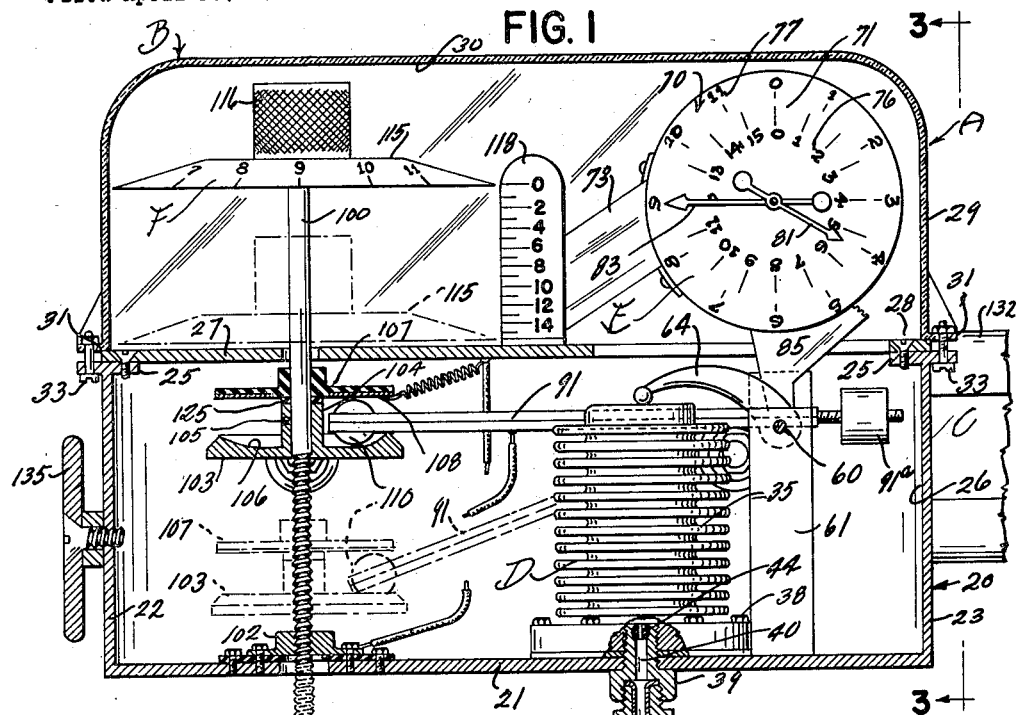
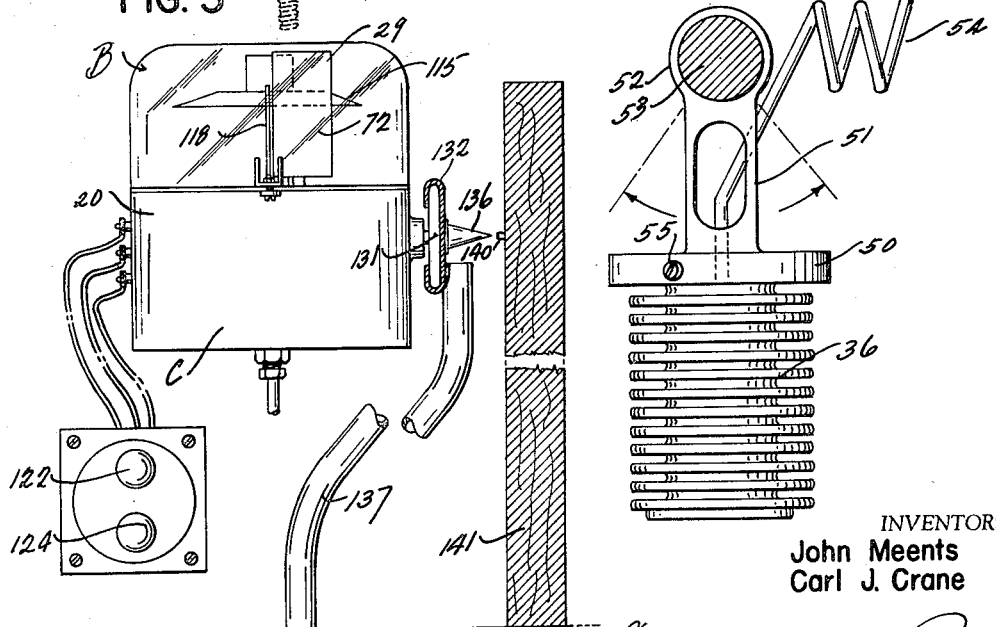
INVENTORS
John Meents
Carl J. Crane
BY *Lancaster, Allwine & Rommel*
ATTORNEYS Sept. 16, 1958 J. MEENTS ET AL 2,851,799
GAUGE FOR DETERMINING VERTICAL HEIGHTS AND DEPTHS
Filed April 13, 1956 3 Sheets-Sheet 2
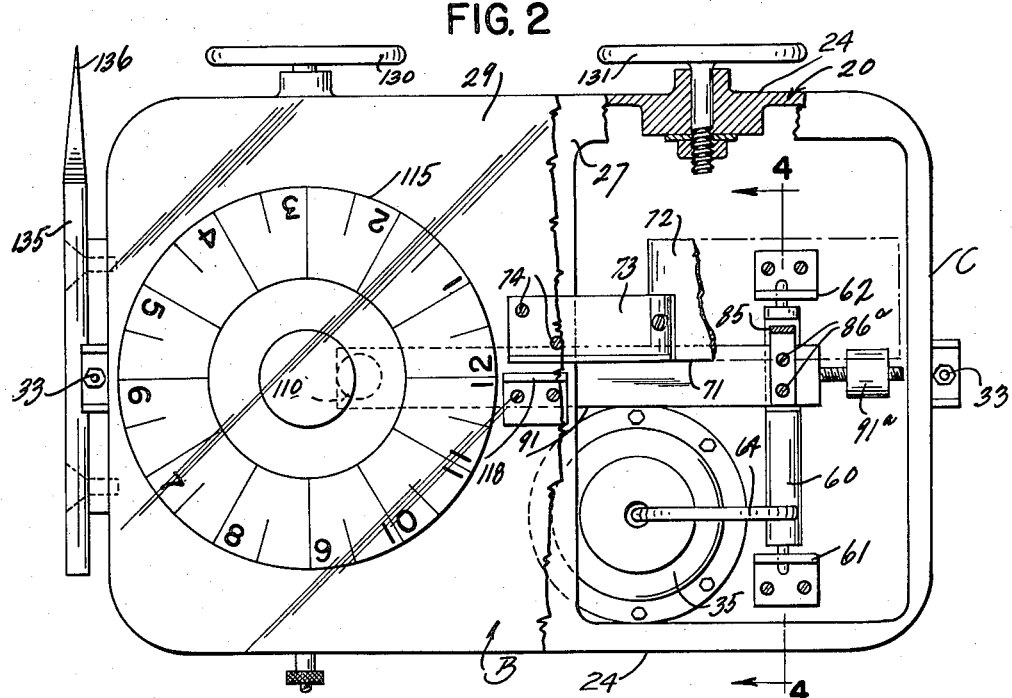
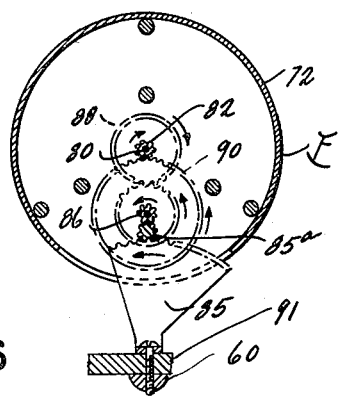
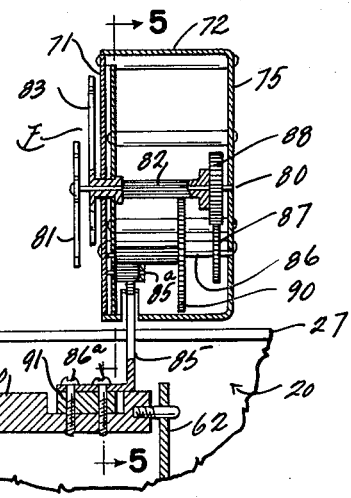
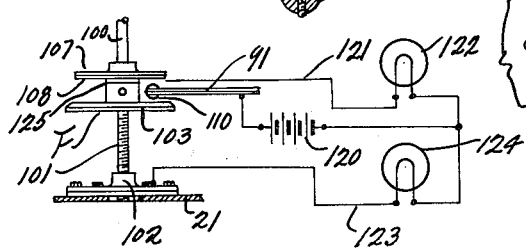
INVENTORS
John Meents
Carl J. Crane
BY *Lancaster, Allwin & Rommel*
ATTORNEYS Sept. 16, 1958  J. MEENTS ET AL  2,851,799
GAUGE FOR DETERMINING VERTICAL HEIGHTS AND DEPTHS
Filed April 13, 1956  3 Sheets-Sheet 3

INVENTORS
John Meents
Carl J. Crane

BY *Lancaster, Allwein & Rommel*
ATTORNEYS

United States Patent Office 2,851,799
Patented Sept. 16, 1958

2,851,799

GAUGE FOR DETERMINING VERTICAL HEIGHTS AND DEPTHS

John Meents and Carl J. Crane, San Antonio, Tex.

Application April 13, 1956, Serial No. 579,115

11 Claims. (Cl. 37—80)

The primary object of this invention is the provision of a gauge which can be used with facility for determining the height or depth of one element of its structure above or below a cooperating sensing element.

A further object of this invention is the provision of an improved appliance for determining vertical heights and depths, such as can be utilized in connection with such equipment as mechanical ditch diggers for accurately maintaining the grade of cut. The same can also be used for ascertaining vertical heights of a slanting bore or hole, that is, the distance from the bottom of the bore or hole perpendicularly to some designated location thereabove.

A further object of this invention is the provision of a gauge for designating heights and depths, such as can be utilized in connection with contour determinations of sloping areas without employing conventional surveying instruments and personnel.

A further object of this invention is the provision of a gauge for designating a vertical distance differential between certain points or locations and which can be utilized in connection with the operation of some accessory mechanism.

Other objects and advantages of this invention will be apparent during the course of the following detailed description.

In the acompanying drawings, forming a part of this specification, and wherein similar reference characters designate corresponding parts throughout the several views:

Figure 1 is a transverse cross sectional view of the improved gauge showing the related features thereof.

Figure 2 is a plan view partly in cross section of the gauge of Figure 1.

Figure 3 is a fragmentary end elevation, partly in section, of the gauge of Figure 1 looking in the direction of the line 3—3 of Figure 1.

Figure 4 is a fragmentary cross sectional view taken through certain indicating details of the gauge and the means for operating the same looking in the direction of the line 4—4 of Figure 2.

Figure 5 is a fragmentary cross sectional view taken substantially on the line 5—5 of Figure 4.

Figure 6 is a detail of an electrical signalling circuit for the gauge and a switch means associated therewith.

Figure 7:
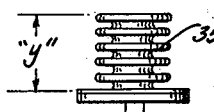
Figure 7 is a schematic representation of certain details used for obtaining motion necessary to operate the details of the gauge.

In the drawings, wherein for the purpose of illustration is shown a preferred embodiment of the gauge and various uses therefor, the letter A may generally designate the height and depth gauge. It includes an indicator head B having a casing structure C with which is associated a device D actuated by variations in fluid pressure to obtain movements, designating locational variations in vertical height and depth for operating certain gauge details. A height and depth indicating means E is provided operated by the movement obtained from D. Control and signalling means F is provided to designate variations from a selected vertical distance for which set. It is operated by the means D.

The casing structure C of the indicator head B is in effect a frame. It preferably includes a lower rectangular box like casing 20 having a bottom wall 21, end walls 22 and 23 and side walls 24, and upwardly provided with inwardly and outwardly extending attaching flanges 25. Its chamber 26 opens at the top where a detachable cover 27 is provided, connected by screws or bolts 28 to the inner flange 25 of the casing portion 20. The casing C furthermore includes a preferably transparent dome 29, of plastic material, having a chamber 30 therein and flanged at its lower end at 31 for detachable connection by means of bolts 33 to the outer portion of the flange 25, as shown in Figure 1.

Figure 7 schematically shows the device D. It includes two expandable "Sylphon" bellows 35 and 36, alike in all physical dimensions, and arranged to be connected by flexible tube 37. The bellows and tube are completely filled with a fluid, preferably mercury, from which all air or other gases have been expelled, thus providing an incompressible system which permits fluid to flow into and out of either bellows due to height differences. In Figure 7 the lower bellows 36 is indicated as expanded to a dimension "X." The upper bellows is shown contracted to a dimension "Y." This indicates that the liquid mercury has passed from the higher bellows to the lower bellows, expanding the latter and contracting the former in proportion to the change of elevation of the two bellows. This difference in extensions of the bellows will be substantially proportional to the difference in vertical height of the two bellows, over the working range for which the system is designed, and is, within limits, independent of the path in which the flexible tube lies. It can be well understood from the foregoing that mechanism can be attached to either one or both of the bellows to indicate height differentials. This transmittal of movement from one bellows to the other is taken advantage of to operate the indicating and control signalling means E and F as will be subsequently described.

In the application of the system just described and shown in Figure 7, to the casing C the upper bellows 35 is fastened by means of screws 38 to the base wall 21 of the casing portion 20 (see Figure 1). A screw threaded fitting 39 also attaches the base of the bellows 35 to the wall 21, and the same has a passageway 40 therethrough. The tube 37 is held in place upon the fitting 39 by means of a jam nut 42 with a leakproof connection. The fitting 39 in the passageway 40 on the top thereof is preferably provided with an apertured spherical rubber ball 44. This provides a flexible restriction in the line 37 in order to damp out movements of the fluid mercury which may result from vibration of the gauge or the machine to which the same is attached.

The lower bellows 36 is provided with mounting means which will enable it to expand and contract vertically. Such means may vary depending upon the use of the gauge and equipment to which it is to be attached. By way of example, as shown in Figure 1, the base 50 of the bellows 36 may be attached to or form part of an extension 51 having an attaching end 52 which may be pivotally connected to any suitable support, such as a shaft 53. It must be understood that this forms a pendulous metallic structure which will enable the bellows 36 to swing through a suitable arc. In order to provide flexibility, tube 37 may be coiled at 54 along its length at one or more locations.

In the arrangement of the bellows as herein described, the bellows 35 is provided solely for contraction because the bellows 36 is always intended to be located at a lower level. When the two bellows are at identical elevations there is no difference in the height of them. However, when the bellows 36 is lowered it will expand because of the mercury within the system and correspondingly the bellows 35 will contract. A plug 55 in the base 50 of the bellows 36 is provided for the purpose of filling the entire system with mercury.

It is within contemplation of this invention to make a bellows with any desired number of convolutions consistent with the degree of extension and counteraction desired.

Referring to the means E for indicating heights and depths, the same operates responsive to the movement differential between the bellows as above described for the system D.

The indicating means E preferably comprises a shaft 60 rotatably supported upon suitable standards 61 and 62 as indicated in Figures 1, 2 and 4 of the drawings. It has mounted thereon follower arm or segment 64 which rests upon the top of the bellows 35 whereby contraction or expansion of the bellows 35 will rock the shaft 60 upon its bearings, as is quite evident.

The means E further includes a dial drum 70 supported by a bracket 73. The latter is connected as at 74, shown in Figure 2 to the wall 27 of the casing structure. The dial drum 70 has a dial wall 71 and a rear wall 75, as is shown in Figure 4. The dial face 71 is provided with two series of delineations; an inner series indicated at 76 designating feet, and the outer series 77 designating inches. The dial walls 71 and 75 support a concentric shaft 80 which at its outer end supports a pointer 81 operating over the dial scale 76. This is what may be conveniently referred to as the "slow" pointer. Concentric with and rotatable upon the shaft 80 is a second shaft 82 which at its outer end is provided with a "fast" pointer 83 for the delineations 77.

The pointers 81 and 83 are operated by rocking movements of the shaft 60. To that end the shaft 60 is provided with a toothed segment 85 secured at 86ᵃ to the shaft 60, as shown in Figure 4. Idler gear 85ᵃ is rotatably supported upon the dial 71 in mesh with the teeth of the sector 85, as shown in Figure 5. The idler gear 85ᵃ meshes with teeth upon a shaft 86 which is pivoted upon the dial box. The pinion shaft 86 has fixed to it a gear 87 meshing with a gear 88 keyed to the shaft 80, and this is the gearing for operating the "slow" pointer 81. The hollow shaft 82 for the fast pointer 83 has teeth thereon in mesh with a gear 90 keyed to shaft 86 which has a ratio of 1:16 with respect to the gear which it engages upon the shaft 82. This enables the fast pointer 83 to rotate 16 times faster than the slow pointer 81 in order to present the proper delineations of feet and inches of depth measurements.

Referring to the height and depth indicating means E, the same is operated off of the contracting bellows 35. It includes a bi-metallic arm 91 which is attached by the screws 86ᵃ above mentioned upon the shaft 60 and extends in right angled relation to the axis of shaft 60 across the chamber 26 of the lower part of the casing structure. This arm 91 forms part of a circuit opening and closing switch for the details of the signalling means F.

The signalling means F comprises a vertical shaft 100 screw threaded at its lower portion 101 and threaded in bushing 102 secured to the bottom wall 25 of the casing structure, as indicated in Figure 1. Mounted upon shaft 100, above the screw threaded portion 101, is a depth disc 103 which includes a hub portion 104 keyed at 105 to the shaft 100. The disc 103 presents an upper face 106 which is dished or concavely sloped or angled in an upward direction towards its outer periphery for a purpose to be subsequently described. The signalling means also includes a follower disc 107, of insulating material, which has a hub portion slidable upon the upper smooth portion of the shaft 100. Upon the under side of insulation disc 107 is a conductor plate 108 which may be fastened as by a suitable adhesive to said under side. The outer end of the bi-metallic arm 91 is provided with a spherical electrical conductor 110 of some non-corrosive finely finished metal for the purpose of engaging either the contact plate 108 or the disc 103 for the purpose of closing circuits.

The shaft 100 at its upper end is provided with a keyed dial 115 having a knob 116 thereon. The knob 116 when rotated will cause movement of the dial in a vertical direction and correspondingly will enable movements of the depth disc 103 and the follower disc 107; the latter as permitted by the position of the bi-metallic arm 91 and its contact ball 110. Associated with the dial 115 is a graduated vertical scale 118 mounted upon the wall 27 to indicate the vertical travel of the dial 115. The delineations upon scale 118 are in feet of height such that for each complete revolution of the dial 115, the latter will change equal to a one foot reading on the vertical scale 118. The dial 115 is tapered to an edge to facilitate reading of the delineations on scale 118. The dial 115 has a series of delineations thereon designating inches. In order to read feet and inches the highest foot reading on the vertical scale 118 should be read followed by reading in inches upon the delineations of the dial 115.

The signalling circuit for mechanism F is shown in Figure 6 where a source of power, such as a battery 120, is employed having one wiring circuit 121 connected therein provided with a visual or audible signal 122; this circuit 121 being connected to the contact plate 108 of the follower disc 107. A second circuit 123 has a visual or audible signal 124 therein. It is connected to the source of power 120 and in circuit with the depth disc 103 through its mounting upon the screw 101 and base 102. A spacer washer 125 lies between the top of hub of the disc 103 and the follower disc 107 and prevents the contact plate 108 from engagement and making contact with the ball element 110 when the element 110 just touches the surface of the disc 103. When the element 110 makes contact with the disc 103 the circuit is closed through the low lamp 124. The dial 115 may be rotated so that the contact ball 110 will not engage either of the switch closing contact plates 103 or 108 for any given position of the bi-metallic arm 91. Under such conditions there will be an open circuit with respect to both lamps 122 and 124. This will signal to the operator that a given depth of cut is being maintained should the device be placed upon a ditch digging machine. In event that the bellows 36 is lowered slightly with a consequent flow of mercury from the other bellows 35 with a resultant compression of the latter, the movement generated thereby and imparted to the arm 91 will cause the element 110 to lower and make contact with the disc 103 and thereby energize the lamp 124 which will signal that the desired depth of cut is not being maintained. Conversely, as the bellows 36 is raised beyond a desired level the flow of mercury from it into the upper bellows will close the circuit through the lamp 122 by engaging the contact ball 16 with the contact plate 108. This signals that the cut is too shallow.

It can be understood from the foregoing that by means of a dial 115 any desired setting may be selected upon the device F in order to provide means for signalling departure of the sensing bellows 36 from a selected depth. The signal lamps 122 and 124 may be placed in any location remote from the location of the indicating element. The upper surface 106 of the depth disc 103 is dished or cammed, in order that equal increments of depth setting by knob 116 will impart equal angular movement to the arm 91 and thence to the pointers of the indicating means E, permitting the use of a uniform scale thereon.

Figure 8:
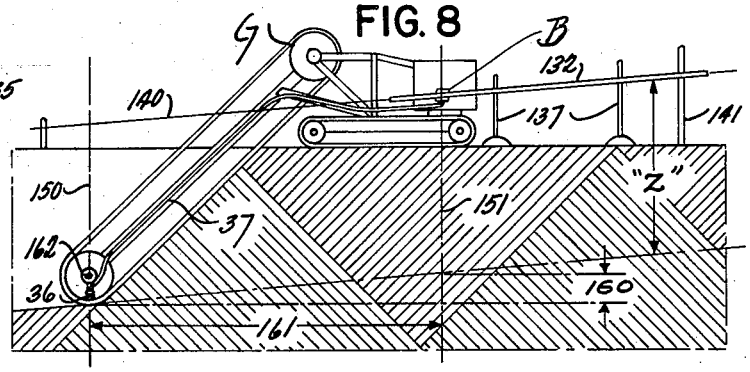
Figure 8 is a diagrammatic view, showing a ditch digging machine and the manner in which the improved gauge may be associated therewith for making cuts having a predetermined grade.
Figure 10:
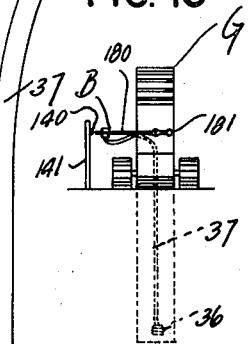
Figure 10 is a diagrammatic endwise view of the details of Figure 8.
Figure 11:
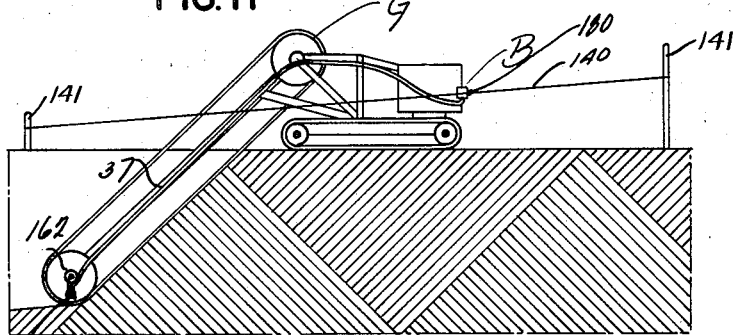
Figure 11 is another diagrammatic view of a ditch digging machine showing a different mode of attaching and utilizing the gauge.

For practical application of the device the lower case portion 20 is provided with a pair of rollers 130 and 131 supported in any approved manner by the case as is shown in Figure 2 for rotatable operation. These rollers are intended to ride in the channel of a guide rail 132, as shown in Figure 3. This rail is supported by uprights 137 which hold it at a desired grade in order that the point 136 of a member 135 will conform to the height of established grade line 140 which may be suitably fastened to stakes 141, such as shown in Figures 8, 10 and 11 of the drawings. The member 135 is connected to case 20 as shown in Figure 2.

The sensitive element 36 may be pendulum supported upon the lower shaft 162 of the ditch digger boom, as above described for the mounting of such structure in Figure 1.

The indicating head B may be positioned directly over the sensitive element 36 along the perpendicular line 150 shown in Figure 8, or it may be placed at a location as shown in Figure 8 upon the line 151. In the latter case the grade depth "Z" will be modified to include a constant increment 160, shown in Figure 6. The distance 161 can be chosen by the operator for locating the indicator head B. The dial 115 will be set to indicate the distance "Z" plus the distance of 160. In the use of the gauge upon the ditch digger, tubing 37 could be fastened to the boom of the ditch digger and lead to any convenient location where the indicator head B will be attached to the guide rail 132 in the position shown in Figure 8. The supporting posts 137 for the guide rail 132 may have weighted lower ends and of course they will be shifted from time to time or additional ones added to support the former rail as the digging continues. It can be seen that the utilization of the height-depth gauge provides a means for accurately controlling the depth of cut in digging of the trench, entirely independent of pitching and rolling of the crawler in the process of ditch digging.

Figure 9:
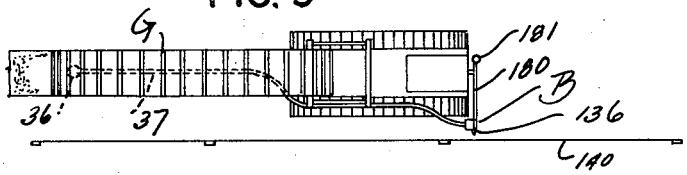
Figure 9 is a diagrammatic plan view of the details of Figure 8.

As an alternative the instrument B may be mounted upon the digging machine on an arm 180 pivoted on the digging machine at 181 in order that the operator can keep the pointer 136, as designated in Figure 9, immediately adjacent to the grade line 140. The operator will have a chart in his possession, for any given type of machine being used, for determining distance 160, where other factors are known.

There may be applications in using the height-depth gauge which will require special supporting members for the instrument case and the lower bellows. The application above described is particularly designed for a boom type ditch digger.

Figure 13:
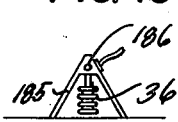
Figure 13 is a view showing a frame which may be utilized for supporting a sensing element of the gauge.

Figure 13 shows a simple tripod type of support 185 for pivotally supporting the lower bellows 36 in a pendulum manner from a shaft 186.

The manner in which the tubing 37 lies or extends along the frame of the ditch digger makes no differences so long as any position of the tubing does not rise an excessive amount above the bellows in the case of the indicating head. What constitutes an excessive amount will depend upon the initial pressure within the closed system. When the two bellows and connecting tube are filled at atmospheric pressure with no air trapped in the system then no part of the tube can rise more than 29.92 inches above the highest bellows at sea level. In the instant example mercury will be forced into the system so that when it is closed it will be a selected pressure of about four atmospheres. Obviously the bellows material and thickness thereof will control the amount of internal pressure that may be applied. With the noted internal pressure a run of tube may then approach a twelve foot height above the higher bellows which will enable proper operation.

Figure 12:
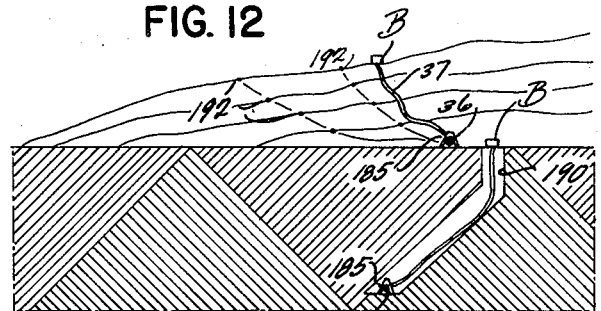
Figure 12 is a diagrammatic view showing the manner in which the improved gauge may be utilized for surveying sloping areas for elevational data such as in connection with the running of contours or for determining the depth of holes.

Two uses of the device are shown in Figure 12. In one case the sensitive bellows 36 is lowered into a slanting hole 190 and the indicating head B is located on the surface. Thus, the operator will be able to obtain the vertical depth of the sensitive element below the indicating element.

It will be possible for a single man working alone to perform a levelling survey of an area within a limit of the length of the flexible tube. By moving the sensitive element to various locations which are indicated by the dots 192 in Figure 12, either through observing the electrical signals of the means E or reading the dial from the means D the distances of 36 below B can be determined. Accordingly, the operator may move the sensitive element 36 to various known locations, adjust the knob 116 upon the instrument until the signal lamps are extinguished and then read either the dial and scale 115 and 118 or the feet and inches designated upon the dial 71. In this way measurements of the surface being surveyed can be readily determined by one man whereas such ordinarily requires two men working together with a Y-level and rod or transit and rod. It will also be possible for a lone operator to follow and establish a contour by employing the lamp signals "too high" or "to low" as he moves the sensitive element over the surface of the terrain. In establishing contour lines such as a farmer may desire to have for contour plowing purposes, the sensitive element 36 may be placed at a given location and the operator will move in the direction of assumed constant level, watching the instrument B as he moves along in order to insure that the instrument reports no change in height of one bellows over the other. In doing this the operator is following an accurate level contour which he can stake as he travels.

It is well known that in cutting a ditch for laying sewer pipes it is very important that the bottom of the ditch be cut accurately to grade. Efforts have heretofore been made to design and provide depth measuring devices which will permit the operator of a ditching machine to travel in a machine over uneven ground and still maintain the proper grade of cut. There are many reasons why such have failed. With the present invention by placing the sensitive element 36 in close proximity to the lower cutting element of a ditch digger, such as by a pendulous support upon the boom axle 162 and by locating the indicator head B of the instrument where it may be controlled and guided and observed the operator can readily determine and hold the depth of cut even though the crawler track encounters a soft spot into which it may sink or ride across elevated spots. Variations of the ditching machine either in roll or pitch angle which have the effect of increasing or decreasing the depth below grade line will be immediately reported to the machine operator and noted on the indicating head B so that the operator can adjust the digging boom in order to obtain proper cutting depth.

The purpose of making arm 91 bi-metallic is to introduce a temperature correction into the device since with the changing temperatures the mercury in the system will expand with increasing temperatures and contract with lower temperatures. Thus the bi-metallic strip will adjust the mechanism in order to insure that calibrations are unaffected by temperature changes.

Various changes in the shape, size and arrangement of parts may be made to the form of invention herein shown and described, without departing from the spirit of the invention or scope of the claims.

We claim:

1. In an earth moving machine, the combination of a supporting frame having running gear and adjustable earth depth excavating means mounted thereon, grade indicating means comprising a pair of expansible containers connected together by a flexible tube and said containers and tube having an air and gas free incompressible liquid filling the same whereby positioning of the expansible containers at different levels will cause the upper container to contract, means mounting the lower expansible container of said indicator upon the digging end of the excavating means, a grade following indicator head having the upper container thereon, indicating means on said head operated by movement of said upper container, and means for enabling said indicating head to follow an established grade line whereby the said indicating means thereon will register departure from proper grade digging by said machine as determined by the relative vertical distances between said containers.

2. A device as described in claim 1 wherein the last mentioned means includes a grade line supporting rail, the indicating head having means thereon for riding along said rail.

3. In an instrument for determining vertical heights and depths, the combination of a supporting case, an expansible "Sylphon" type bellows mounted upon the case in fixed relation at one end and the other end of the bellows being movable, a second "Sylphon" type bellows having communication with and connected to the first mentioned "Sylphon" type bellows by a flexible tube, an incompressible liquid in the two bellows and said tube whereby differences in levels of the two bellows will expand and contract the same, a vertical depth distance indicator mounted upon the case including a member which is vertically movable manually to designate different vertical depths, a switch construction comprising a contact carried for axial movement along with said movable member and a second contact slidable along the movable member relative to the first contact, a switch arm movable responsive to expansion or contraction of the case bellows, and circuit closing means mounted upon the switch arm and positioned to engage either of said contacts for closing signalling circuits to indicate variations in vertical distances between the two bellows from that as determined by the pre-set indicating distance of said indicator.

4. An instrument as described in claim 3 in which a second indicating means is mounted upon said case operatively connected to the case bellows for operation thereby during expansion and contraction thereof for indicating depth distances corresponding to the actual vertical distance between said bellows.

5. In a gauge for designating depth and height, the combination of a supporting frame, a scale upon the frame having delineations designating depths, a shaft member secured to said frame and longitudinally movable with respect to said frame, a dial mounted upon said shaft member positioned proximate to said scale for determining the vertical adjustment of said member upon said frame, spaced contact plate means mounted upon said shaft member, a pair of "Sylphon" type expansible and contractable bellows connected by a flexible tube, one of said bellows having an end thereof connected fixedly to said frame whereby the other end of that bellows may move due to expansion and contraction depending upon the horizontal plane position of the other bellows with respect to said frame, and signalling means including a contact arm connected between said spaced contact plate means and the movable end of said bellows whereby to signal departure of positioning of the bellows vertically with respect to each other above or below the distance designated by the dial of said shaft member upon said scale delineations.

6. A height and depth gauge as described in claim 5 in which a height indicating means is mounted upon said frame operated by relative movement of the bellows which is mounted upon said frame to indicate actual vertical distances between the two bellows.

7. In a gauge for determining vertical heights and depths, the combination of a supporting frame, an expansible "Sylphon" type bellows mounted at one end in fixed relation upon the frame so that its other end may move to expansion and contraction of said bellows, a second bellows free of connection with said frame and having a tube connection with the first mentioned bellows, the two bellows and the tube being filled with an incompressible liquid whereby movement of the case attached bellows will correspond to the vertical depth distance between the two bellows, a scale mounted upon said frame designating depths and heights, a vertical shaft screw threaded upon said frame for rotation whereby to longitudinally and axially move said shaft upon the frame, said shaft having dial means proximately disposed with respect to the scale to indicate the relative axial position of the shaft upon said frame, an electrically actuated indicating means including a pair of contacts mounted upon said shaft, one of which is fixed for axial movement with the shaft and the other of which is slidable axially along the shaft, and circuit bridging means mounted upon the frame for relative movement by the movable end of the frame bellows for opening and closing independent circuits through the said contacts whereby to signal when the position of the two bellows is above or below predetermined scale measurements as indicated by the dial means upon said shaft in relation to said scale.

8. A height and depth gauge as described in claim 7 in which an indicator is mounted upon said frame having operating means connected to the movable end of the frame bellows for designating in measured distances the actual vertical distance between said bellows.

9. In a gauge for determining vertical heights and depths, the combination of a supporting frame, a pair of "Sylphon"" type bellows, one of which is fixedly connected at one end upon said frame so that its other end may move relative to the frame, a flexible tube connecting the two bellows so that the other bellows may move bodily with respect to said frame, said bellows and tube having disposed therein an incompressible liquid, indicating means mounted upon said frame having means connecting it for operation by the movable end of the frame bellows whereby to indicate vertical distances between the two bellows, a grade line guide rail, and means for detachably connecting the frame to the guide rail for movement therealong.

10. A gauge for determining vertical heights and depths, comprising a closed fluid pressure system including a pair of expansible bellows having chambers therein, a flexible connecting tube connecting said bellows and having a passageway therein opening to said chambers, a non-compressible liquid in said tube and bellows chambers, indicating means connected to one of the bellows movable responsive to expansion and contraction of said bellows when the two bellows are located at different horizontal levels whereby to indicate the vertical distance variations between said two levels, indicating means including electrical signalling means having a pair of vertically spaced contact plates, a pivotally supported contact arm disposed between said plates and normally out of contact with said plates when a predetermined vertical distance between the bellows is maintained, said contact arm moving into contact with the uppermost of said plates when the distance between said bellows is less than desired closing a first signalling circuit, and said contact arm moving into contact with the lowermost of said plates when the distance between said bellows is greater than desired closing a second signalling circuit.

11. A gauge construction for determining vertical heights and depths, comprising a supporting case, a bellows carried by the case, a movable sensing bellows, a tube connecting the two bellows, said bellows and tube comprising a closed system, said closed system being filled with an incompressible liquid at a pressure greater than atmospheric pressure whereby the case bellows will expand and contract dependent upon the relative movement of the sensing bellows with respect to the case bellows, an indicator carried by said case, means connecting said indicator to the movable portion of the case bellows whereby movement of said case bellows will indicate the vertical difference in levels between the two bellows, and electrical signalling means for signalling relative movement of the bellows away from each other beyond a predetermined vertical spacing of them, including a vertically movable shaft secured to said case, a pair of vertically spaced contact plates supported upon said shaft, a contact arm secured to said indicator connecting means and disposed between said contact plates, the desired vertical spacing of said bellows being set by the vertical adjustment of said plates by vertical movement of said shaft, the said contact arm moving into contact with the uppermost of said plates when the distance between said bellows is less than the desired vertical spacing closing a first signalling circuit and said contact arm moving into contact with the lowermost of said plates when the distance between said bellows is more than the desired vertical spacing closing a second signalling circuit.

References Cited in the file of this patent

UNITED STATES PATENTS

| | | |
|---|---|---|
| 246,718 | Cable | Sept. 6, 1881 |
| 723,040 | Schmitz | Mar. 17, 1903 |
| 1,099,385 | Linga | June 9, 1914 |
| 1,290,875 | Baldwin et al. | Jan. 14, 1919 |
| 1,369,235 | Funk | Feb. 22, 1921 |
| 2,043,413 | Knox et al. | June 9, 1936 |
| 2,557,021 | Williams | June 12, 1951 |
| 2,694,195 | Martin | Nov. 9, 1954 |

OTHER REFERENCES

Publication: Geophysics, vol. XVI, Issue No. 3, "Hydrostatic Level for Elevation Surveying," pages 486 to 493, inclusive, July 1951.